United States Patent [19]

Madlem

[11] 3,895,830

[45] July 22, 1975

[54] CONDUIT ADAPTER

[76] Inventor: John R. Madlem, Box 136A3, High Falls Rd., R.D. 1, Catskill, N.Y. 12414

[22] Filed: Apr. 1, 1974

[21] Appl. No.: 457,066

[52] U.S. Cl............... 285/27; 138/117; 285/137 R; 285/177; 285/419
[51] Int. Cl.² ........................................ F16L 35/00
[58] Field of Search........ 285/176, 177, 137 R, 373, 285/419, 386, 20, 27; 138/111, 115, 116, 117, 157, 158, 162, 166

[56] References Cited
UNITED STATES PATENTS

| 259,045 | 6/1882 | Richardson ..................... 285/137 R |
| 376,562 | 1/1888 | Powers et al..................... 285/137 R |
| 379,408 | 3/1888 | Muckle........................... 138/157 X |
| 1,026,607 | 5/1912 | Scherer........................... 285/176 X |
| 1,459,476 | 6/1923 | Meredith ........................... 138/117 |
| 3,421,781 | 1/1969 | Spurk................................. 285/176 |

FOREIGN PATENTS OR APPLICATIONS

| 905,633 | 3/1954 | Germany ............................ 138/157 |
| 14,552 | 1900 | United Kingdom................. 138/115 |

Primary Examiner—Dave W. Arola
Attorney, Agent, or Firm—Edelson and Udell

[57] ABSTRACT

Adapters for coupling multi-conduit cavity ceramic conduits of square conduit cross section to a plurality of individual circular cross section conduit pipes of the same or different cross sectional areas. The adapters are of multi-section construction formed of strong but relatively light weight plastic material, the adapter sections having interfitting keys and keyways which prevent sliding movement of the sections relatively to one another. Sockets are molded in one end of the adapter sections to receive the ends of the circular conduit pipes, and alignment pin sockets are molded in the opposite ends of the adapter sections to receive alignment pins which also engage the ceramic conduits to align the latter with the adapter end face. The adapter sections are made to provide expandability of the number of conduits which can be coupled, and a tapered form of adapter is disclosed for intercoupling conduits of different sizes. The adapter sections after installation are secured together by banding, and the assembly is encapsulated.

17 Claims, 9 Drawing Figures

PATENTED JUL 22 1975　　3,895,830
SHEET 1

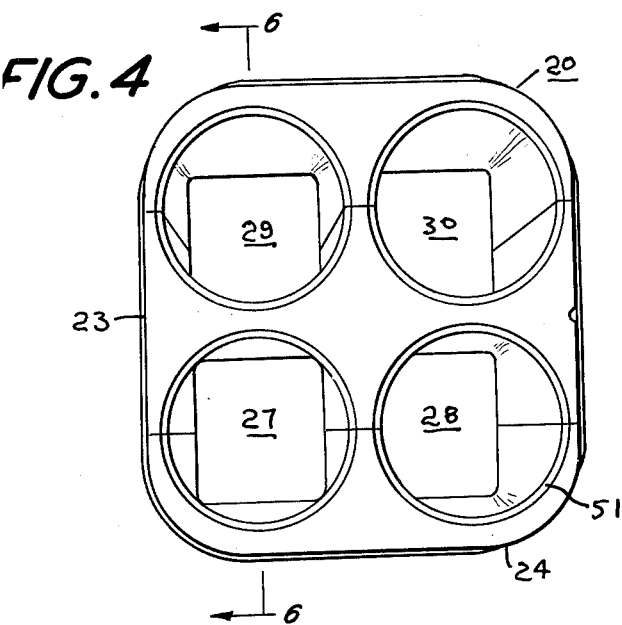
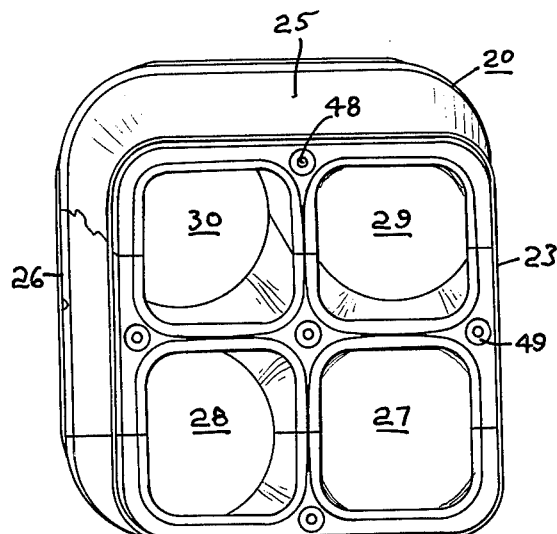
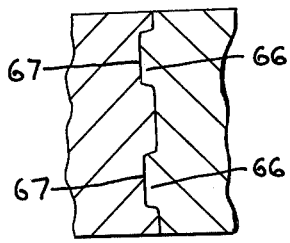
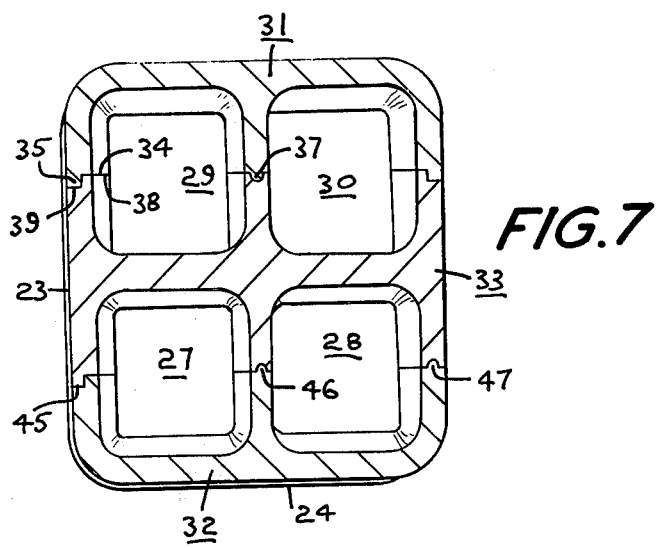
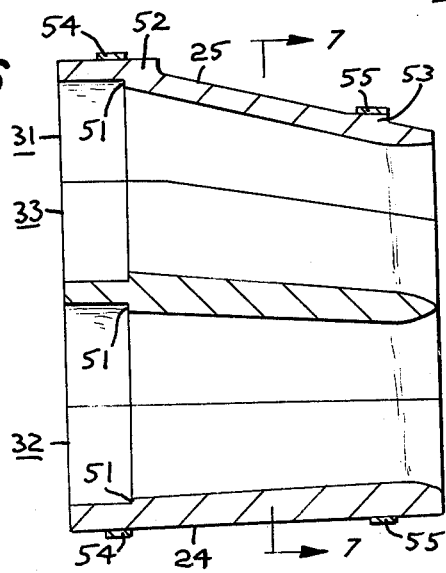
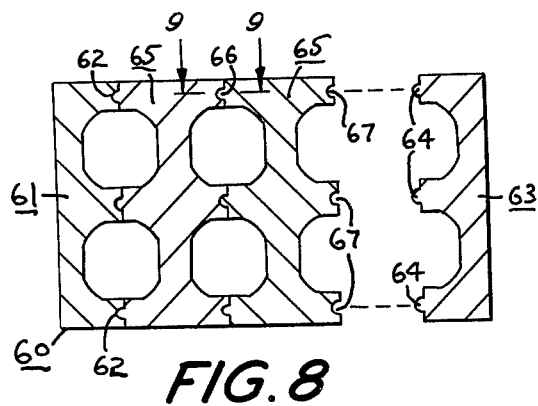

CONDUIT ADAPTER

This invention relates to adapter devices, and more particularly relates to adapters for coupling different types of conduit as used for carrying cables of electric conductors.

In the past, the conduits used for example by the telephone companies for carrying underground cables were precast ceramic conduits of perhaps 20 feet in length per section. These ceramic conduits were usually of multiple cavity construction such as containing four, six, eight or even more conduit cavities in a single cast section. The cross section of the conduit channels of the cast sections are generally square and have been made in different cross sectional sizes. Today, these ceramic type conduits are being rapidly phased out of use and are being replaced by conduits of single circular cross section generally formed of plastic materials. Most telephone systems are attempting to standardize on a single diameter conduit pipe, such as a pipe of 4-inch diameter. Consequently, various problems have been encountered in attempting to couple the single circular plastic pipes to the integrally cast multiple square conduit ceramic tile structures. This problem occurs wherever extensions of existing runs are installed, and where existing tile conduits must be broken into at some intermediate point to establish a conduit junction for a lateral take-off.

Accordingly, it is a primary object of the invention to provide a novel conduit adapter for joining ceramic tile conduit having one shape of cross sectional opening to a conduit of circular cross section.

Another object of the invention is to provide a novel conduit adapter for joining together a multi-cavity ceramic tile conduit to a plurality of circular cross section pipe conduits.

A further object of the invention is to provide a novel conduit adapter as aforesaid in which the conduits to be joined have cross sectional dimensions of different magnitude.

Another object of the invention is to provide a novel conduit adapter as aforesaid which is formed in a plurality of disassemblable parts provided with interfitting keys, the adapter being made of light weight material for easy handling in confined spaces.

The foregoing and other objects of the invention will become clear from a reading of the following specification in conjunction with an examination of the appended drawings, wherein:

FIG. 4 is an end elevation looking into the end of the conduit adapter which accepts the single circular cross section pipe conduits;

FIG. 5 is an end elevation from the end opposite that of FIG. 4 showing the end to which connects the multiple channel ceramic tile conduit;

FIG. 6 is a vertical sectional view through the assembled conduit adapter as would be seen when viewed along the line 6—6 of FIG. 4;

FIG. 7 is a vertical cross sectional view through the assembled conduit adapter as would be seen when viewed along the line 7—7 of FIG. 6;

FIG. 8 is a cross sectional view through a modified form of adapter which is of the straight-through type showing the transverse keying of the sections one to another; and FIG. 9 is an enlarged fragmentary cross section through one of the interfitted keys as would be seen when viewed along the line 9—9 of FIG. 8.

In the several figures, like elements are denoted by like reference characters.

Figure 1:
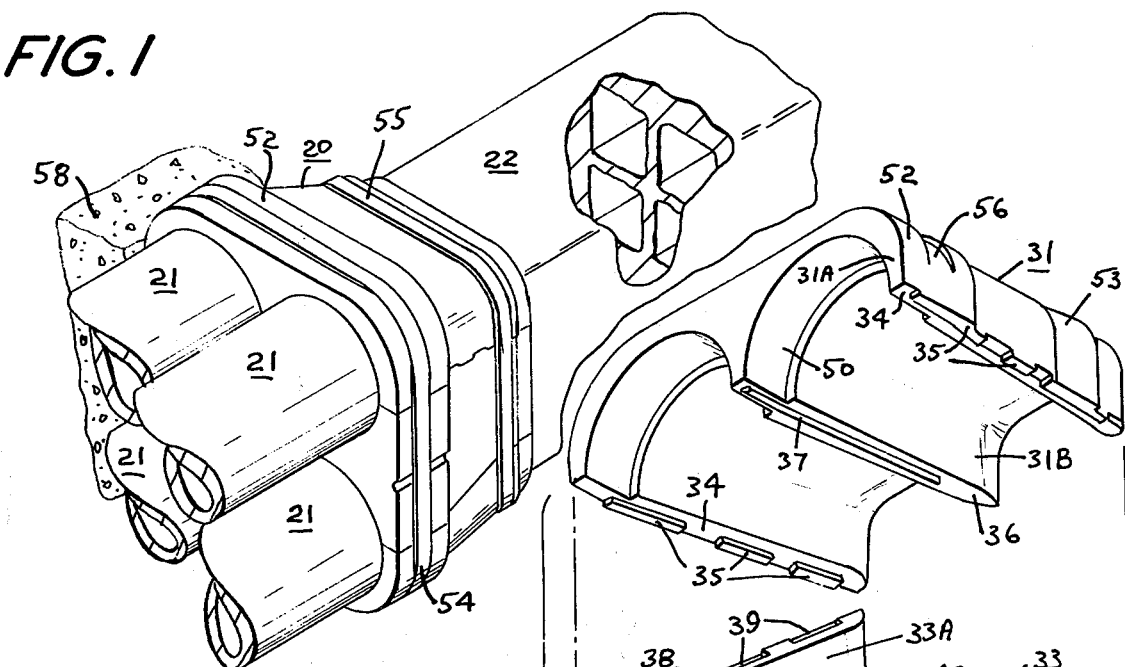
FIG. 1 is a perspective view of a conduit adapter according to the invention shown in assembled condition joining together a ceramic tile conduit of four channels with four circular cross section pipe conduits.

Referring now to the drawings, there is seen in FIG. 1, an adapter generally designated as 20 into which are projected from the fore end four individual circular type conduits designated as 21, and to which is abutted at its opposite end a four conduit integrally cast ceramic tile conduit 22.

As best seen from the showings of FIGS. 2, 3, 4 and 5, the adapter 20 has a side face 23 and a bottom face 24 which are disposed in substantially orthogonal planes, whereas the top face 25 and the other side face 26 are disposed in planes which are angularly related respectively to the bottom face 24 and first side face 23 so that the top and the bottom faces diverge from one another as for example viewed in FIG. 5, as do the side faces 23 and 26. This divergent or tapered construction of the adapter permits the coupling of a ceramic four conduit tile having conduits of one size to be coupled to circular conduits of a substantially larger size. By disposing the side and bottom faces 23 and 24 orthogonally, this same tapered adapter can be utilized to transition from one to four of the four conduit ceramic tiles to from four to 16 single circular pipe conduits, providing of course that the ceramic conduit tiles were arranged in a square array or some portion thereof.

The tapered effect is most clearly seen in the end elevations and cross sections of FIGS. 4 through 7 wherein it is observed that the adapter conduit 27 located at the corner of the adapter where faces 23 and 24 converge is a straight through conduit and does not slope in any direction. The adapter conduit 28 immediately to the left of conduit 27 as viewed in FIG. 5 is observed to diverge toward the left by basically following the direction of taper of side face 26. Adapter conduit 29 which lies directly above conduit 27 diverges upward in parallel relation to the taper of top face 25, and adapter conduit 30 which lies above conduit 28 diverges both upwardly in accordance with the taper of top face 25 and also laterally in accordance with the taper of side face 26. The rate of divergence of adapter conduits 28, 29 and 30 is even further accentuated by the fact that conduit 27 expands in cross section as it extends from the square cross section end toward the round cross section end.

The adapter is formed of a molded top section 31, a bottom section 32 and a central section 33. The top and bottom sections are not mirror images of one another because of the taper factor, and accordingly the top section 31 and bottom section 32 cannot be interchanged for purposes of interfit with the central section 33. As best seen from the exploded view of FIG. 3, the upper half of each of adapter conduits 29 and 30 is formed by the outer legs 31A and the central leg 31B which depend from the upper wall of the top section 31, while similarly the bottom section 32 is formed by upwardly extending outer legs 32A and a central leg 32B which together form the lower halves of adapter conduits 27 and 28. Central section 33 is formed with outer legs 33A and a central leg 33B all of which extend both upwardly and downwardly to form respectively the lower halves of adapter conduits 29 and 30 and the upper halves of adapter conduits 27 and 28.

The top section outer legs 31A terminate in lower faces 34 from which downwardly project keying elements 35, and similarly, central leg 31B terminates in a lower face 36 from which downwardly projects an elongated key 37. The upper portions of central section outer legs 33A terminate in upper faces 38 from which are downwardly recessed key sockets 39 adapted to close fittingly receive the depending keying elements 35 of the upper section outer legs 31A. Similarly, the upper portion of central section central leg 33B terminates in an upper face 40 provided with an elongated downwardly recessed key socket 41 adapted to close fittingly receive the key 37 which depends from the central leg 31B of top section 31. The legs of bottom section 32 similarly terminate in upper faces 42, 43 and 44 provided respectively with the key socket 45 and keys 46 and 47. Although not visible in the showing of FIG. 3, the lower portions of central section outer legs 33A and central leg 33B terminate in lower faces provided with keys and key sockets of complemental shape to the key socket 45 and keys 46 and 47 of the bottom section 32.

It is observed that the keys and key sockets do not run continuously from one end to the other of the coupler so that when the coupler sections are assembled together with the keys interfitted, the sections are not slidable with respect to one another along their facing surfaces in any direction whatever but are immovably constrained with respect to any such sliding movements. The adapter is made in sections because it is utilized under circumstances where access to the wires of the cables may be necessary, and where the conduits are physically positioned in open trench environments so that the adapter is installed by end abutment with the ceramic conduit tile but enclosing capturing relation about the circular pipe conduits.

Figure 2:
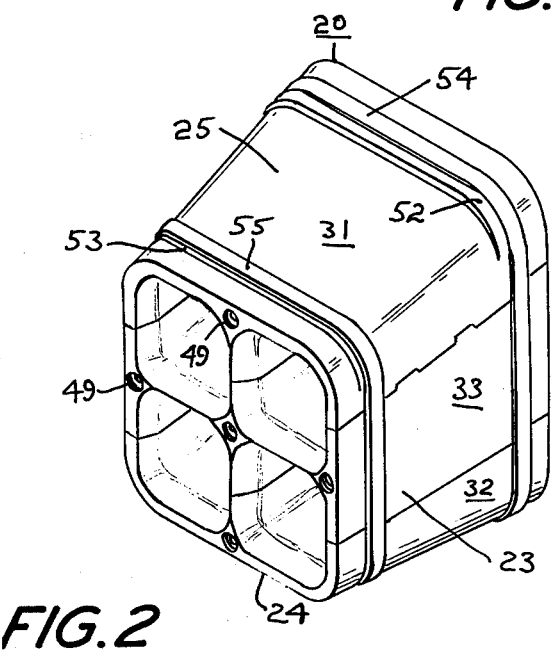
FIG. 2 is an isometric view of the conduit adapter according to the invention which is shown in FIG. 1 but as viewed from the opposite end.

The means of adapter connection to the ceramic conduit tile is best seen in the showings of FIGS. 2 and 5 wherein it is observed that the square apertured end face of each of the top section 31, bottom section 32 and central section 33 are provided with pin receiving holes 48 centrally disposed within counterbores 49. The pin receiving holes 48 and counterbores 49 match an identical set in the end face of the conduit tile 22, and special alinement pins are disposed in these holes and extend between and longitudinally aline the conduit tile 22 and matching end face of the conduit adapter 20.

Figure 3:
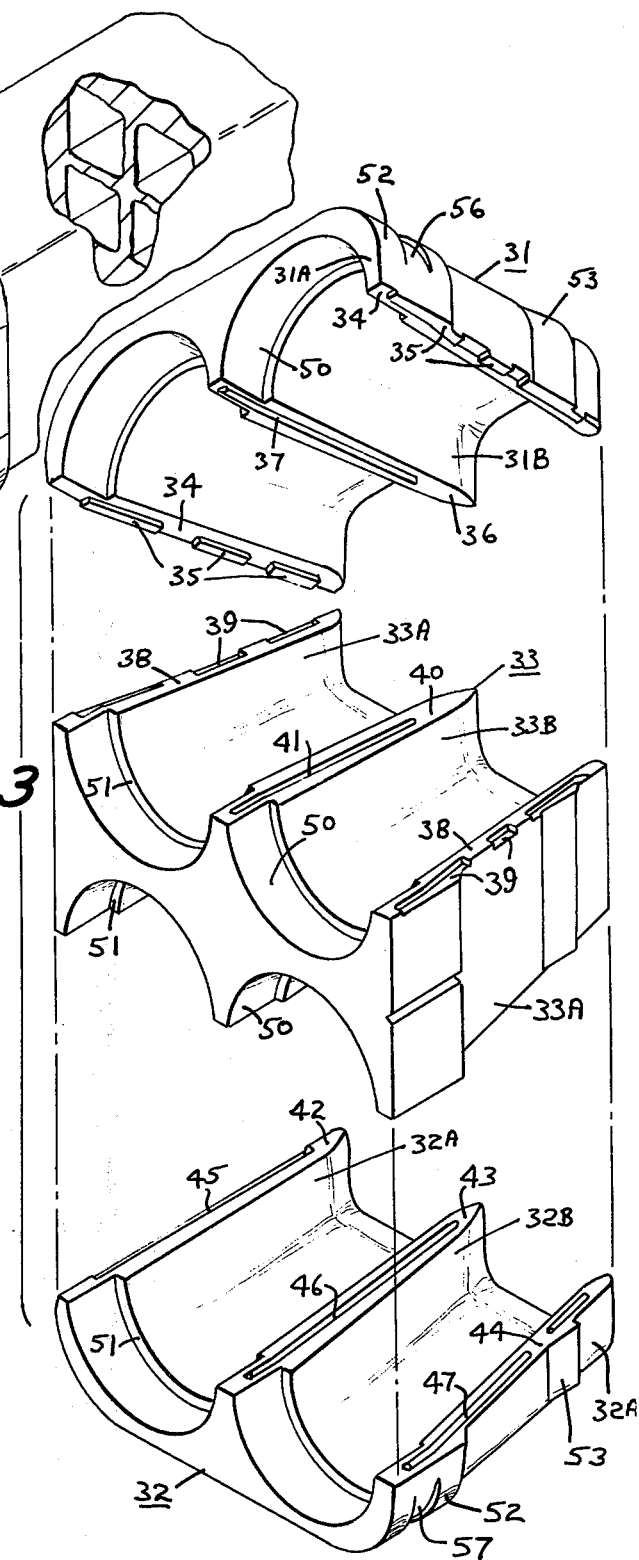
FIG. 3 is an exploded isometric view of the conduit adapter according to the invention as seen in FIG. 1 and showing the transition from a circular to a substantially square cross section.

As best seen in FIGS. 3, 4 and 6, the end face of the adapter which receives the pipe conduits 21 is circularly apertured as at 50 of a diameter to close fittingly receive the outer circumference of the pipe conduits 21, the circular apertures 50 extending inward into the body of the adapter for a distance of approximately several inches and terminating in an annular abutment wall 51 against which the ends of the pipe conduits 21 abut.

The adapter is installed by first slipping the bottom section 32 under the cables emerging from the bottom conduits of conduit tile 22, laying the cables in adapter conduits 27 and 28 and placing the alinement pin in position for the bottom section 32 and then end abutting the bottom section 32 with the ceramic conduit tile 22. Next, the lower conduit pipes 21 may be brought into position and slipped endwise into the apertures 50 of the adapter bottom section 32 until the conduit ends abut with the annular abutment wall 51 of the lower section. The central adapter section may be now carefully installed with alinement pins to the ceramic conduit tile 22 and seated downward into keying relationship with the lower section 32, of course thus completing the closure about the lower circular conduit pipes 21. The cables from the upper two conduits of the conduit tile 22 are now laid into the upper conduits 29 and 30 of the adapter 20, and the upper two conduit pipes 21 are installed. The top section 31 of the conduit adapter 20 is then installed to complete the closure about the cables, and it only remains to secure the adapter together to prevent separation of the three adapter sections. This is accomplished as follows.

As best seen in FIGS. 1 to 3, 5 and 6, the adapter top section 31 is formed with a pair of platforms 52 and 53 which have upper surfaces substantially parallel to the bottom face 24 of the assembled adapter. These platforms 52 and 53 provide surfaces upon which are flatwise seatable a pair of banding straps 54 and 55 which are secured about the three sections of the adapter after the latter has been assembled to hold the sections securely together. Without the banding platforms 52 and 53, the bands 54 and 55 would tend to slip downward on the top surface 25 of the adapter top section 31, and would consequently not be functionally operative to hold the adapter securely together. The non-slip positioning of the banding strap 54 is further secured by providing channels 56 and 57 respectively at the corners of top section 31 and bottom section 32 of the adapter substantially centrally within the banding platform 52.

When the adapter 20 has been completely assembled and banded, it is embedded in concrete, shown at 58 in FIG. 1, in order to further rigidify the coupling joint and prevent the admission of water into the interior of the adapter through the various interstices. In the event that the structural strength of concrete is not needed at a particular adapter joint, the adapter encapsulation could be accomplished with other substances such as resins or other plastic materials.

A somewhat different embodiment of the invention is illustrated in FIGS. 8 and 9, which show in cross section the construction of a straight-through adapter designated generally as 60 in which the relative sizes of the pipe conduit with respect to the conduit tile which are to be intercoupled is such that the adapter conduits are substantially straight and parallel and do not have to be tapered. In such a case, only three types of section are required to provide the flexibility of an adapter having an expandible number of conduit cavities.

As shown in FIG. 8, the left-hand adapter section 61 is formed with keying recesses 62 while the right hand section 63 is formed with keys 64 of the proper size and shape to close fittingly interfit with the keying recesses 62 of the left hand section 61, although this physical relationship is not shown in FIG. 8. When the left hand section 61 and right hand section 63 are so interfitted, they form a two conduit adapter. However, as shown in FIG. 8, a plurality of central sections 65 are utilized to form a six conduit adapter.

Each of the central sections 65 has formed upon its left hand legs keys 66 which are identical to the keys 64 of the right hand section 63, and each central section 65 has formed on its right hand legs a plurality of keying recesses 67 which are identical to the keying recesses 62 of the left hand section 61. Accordingly, it is observed that the adapter 60 can be expanded to provide additional increments of two conduits by inserting additional central sections 65. It is of course to be understood that while each of the end and central sections of the adapter shown in FIG. 8 are formed with two half conduit recesses, the adapter is not so limited, and the sections may be formed to have three, four or as many as desired half conduit sections.

Having now described my invention in connection with particularly illustrated embodiments thereof, it will be appreciated that variations and modifications of the invention may now occur from time to time to those persons normally skilled in the art without departing from the essential scope or spirit of the invention, and accordingly it is intended to claim the same broadly as well as specifically as indicated by the appended claim.

What is claimed as new and useful is:

1. An adapter for joining a conduit of substantially square internal open cross section to a conduit of substantially circular internal open cross section comprising in combination, a pair of adapter outer half sections each of which has one open end of semi-circular shape and the opposite open end of semi-square shape, said one open end and said opposite open end being spaced apart with an intervening wall extending therebetween, the inside surface of said intervening wall changing gradually in cross sectional shape from semi-circular to semi-square to thereby form a half conduit, said intervening wall section of each adapter half section terminating along its length from said one open end to said opposite open end in a pair of faces in surface engagement with the pair of faces of the other adapter half section, at least one of said pair of faces of one adapter half section having at least one key element extending therefrom toward the surface engaging face of the other adapter half section, and the face of the other adapter half section toward which said at least one key element extends being formed with a key element receiving recess of proper shape to receive said at least one key element, said adapter half sections being placed with their faces engaged and said key element disposed in said key element receiving recess to thereby form a conduit of circular cross sectional opening at one end which transitions through the length of the adapter to substantially a square cross sectional opening at the other end and in which the assembled adapter halves are restrained from relative sliding movement by said interengaged key element and key element receiving recess, and means holding the adapter sections in assembled relationship.

2. An adapter as described in claim 1 wherein at least one of said adapter halves is provided with first alignment means for close fittingly aligning a conduit of substantially square internal cross section with the adapter end of the same shape, and is provided with second alignment means for close fittingly aligning a conduit of substantially circular internal cross section with the adapter end of the same shape.

3. An adapter as described in claim 2 wherein said first alignment means comprises a plurality of alignment pin receiving apertures formed in the adapter end characterized by the substantially square cross sectional opening, said pin receiving apertures being oriented to receive and hold alignment pins so that the pins extend in longitudinal extension of said adapter for aligning engagement with the end of a conduit of substantially square cross sectional opening.

4. An adapter as described in claim 2 wherein said second alignment means comprises an open ended socket recessed for a distance into said adapter from the adapter end characterized by the circular cross sectional opening, one open end of said socket aligning with the open circular cross section end of said adapter conduit and the other open end of said socket opening through the end of said adapter, said socket being formed to receive a conduit of circular internal open cross section and terminating in an abutment within the body of said adapter against which the socket received conduit is adapted to be abutted.

5. An adapter as described in claim 2 wherein at least two of the non-apposed faces of said pair of adapter half sections each have at least one key element extending therefrom toward the apposed engaging faces of the other adapter half section, and the said apposed faces toward which said key elements extend are formed with key element receiving recesses of proper shape to receive said key elements, and wherein each said adapter outer half section is formed with a side by side plurality of said half conduits to thereby form with the other adapter outer half section a plurality of adapter conduits extending in side by side relationship from one end of said adapter to the other end.

6. An adapter as described in claim 5 wherein the areas of the circular cross sectional openings at one end of said adapter are different from the areas of the substantially square cross sectional openings at the opposite end of said adapter.

7. An adapter as described in claim 6 wherein said second alignment means comprises an open ended socket recessed for a distance into said adapter from the adapter end characterized by the circular cross sectional opening, one open end of said socket aligning with the open circular cross section end of said adapter conduit and the other open end of said socket opening through the end of said adapter, said socket being formed to receive a conduit of circular internal open cross section and terminating in an abutment within the body of said adapter against which the socket received conduit is adapted to be abutted.

8. An adapter as described in claim 7 wherein said first alignment means comprises a plurality of alignment pin receiving apertures formed in the adapter end characterized by the substantially square cross sectional opening, said pin receiving apertures being oriented to receive and hold alignment pins so that the pins extend in longitudinal extension of said adapter for aligning engagement with the end of a conduit of substantially square cross sectional opening.

9. An adapter as described in claim 5 further including at least one adapter intermediate section assembled with and between said adapter outer half sections, said at least one intermediate section being formed so that the portion thereof which faces said one adapter outer half section is formed in the complemental configuration to said one adapter outer half section, and the portion of said at least one intermediate section which faces said other adapter outer half section is formed in the complemental configuration to said other adapter outer half section.

10. An adapter as described in claim 1 wherein at least two of the non-apposed faces of said pair of adapter half sections each have at least one key element extending therefrom toward the apposed engageable faces of the other adapter half section, and the said apposed faces toward which said key elements extend are formed with key element receiving recesses of proper shape to receive said key elements.

11. An adapter as described in claim 1 wherein each said adapter outer half section is formed with a side by side plurality of said half conduits to thereby form with the other adapter outer half section a plurality of adapter conduits extending in side by side relationship from one end of said adapter to the other end.

12. An adapter as described in claim 11 wherein said plurality of adapter conduits extending in side by side relationship are each characterized by a longitudinally extending central axis, wherein the central axis of one of said conduits is designated as a reference axis, and wherein the central axis of at least one of the remaining plurality of conduits is non-parallel to the said reference axis.

13. An adapter as described in claim 1 wherein the area of the circular cross sectional opening at one end of said adapter is different from the area of the substantially square cross sectional opening at the opposite end of said adapter.

14. An adapter as described in claim 1 further including at least one adapter intermediate section assembled with and between said adapter outer half sections, said at least one intermediate section being formed so that the portion thereof which faces said one adapter outer half section is formed in the complemental configuration to said one adapter outer half section, and the portion of said at least one intermediate section which faces said other adapter outer half section is formed in the complemental configuration to said other adapter outer half section, whereby said adapter outer half sections and at least one intermediate section form an adapter having at least two transition conduits extending therethrough from one end to the other of said adapter.

15. An adapter as described in claim 1 wherein each said adapter outer half section is formed with a side by side plurality of said half conduits to thereby form with the other adapter outer half section a plurality of adapter conduits extending in side by side relationship from one end of said adapter to the other end, wherein said plurality of adapter conduits extending in side by side relationship are each characterized by a longitudinally extending central axis, wherein the central axis of one of said conduits is designated as a reference axis, and wherein the central axis of at least one of the remaining plurality of conduits is non-parallel to the said reference axis, and further including at least one adapter intermediate section assembled with and between said adapter outer half sections, said at least one intermediate section being formed so that the portion thereof which faces said one adapter outer half section is formed in the complemental configuration to said one adapter outer half section, and the portion of said at least one intermediate section which faces said other adapter outer half section is formed in the complemental configuration to said other adapter outer half section.

16. An adapter as described in claim 15 wherein said plurality of adapter conduits extending in side by side relationship are each characterized by a longitudinally extending central axis, wherein the central axis of one of said conduits is designated as a reference axis, and wherein the central axes of all of the remaining plurality of conduits are non-parallel to the said reference axis.

17. An adapter as described in claim 16 wherein the adapter conduit characterized by said reference axis is physically located at one corner of said adapter.

* * * * *